United States Patent
Castellon

(10) Patent No.: US 6,557,433 B1
(45) Date of Patent: May 6, 2003

(54) TELESCOPIC SHAFT FOR STEERING COLUMNS IN MOTOR VEHICLES WITH LOADING CONTROL SLIDING SYSTEM

(76) Inventor: Melchor Daumal Castellon, Diputación, 455-457, 08013 Barcelona (ES)

( * ) Notice: Subject to any disclaimer, the term of this patent is extended or adjusted under 35 U.S.C. 154(b) by 0 days.

(21) Appl. No.: 09/674,335

(22) PCT Filed: Jan. 18, 2000

(86) PCT No.: PCT/ES00/00015
§ 371 (c)(1),
(2), (4) Date: Oct. 30, 2000

(87) PCT Pub. No.: WO00/55028
PCT Pub. Date: Sep. 21, 2000

(30) Foreign Application Priority Data

Mar. 16, 1999 (ES) .................................. 9900543

(51) Int. Cl.⁷ .............................. B62D 1/18; F16D 3/06
(52) U.S. Cl. ......................... 74/492; 403/359.1; 74/504
(58) Field of Search .................... 403/359.1, 559.4, 403/559.5; 384/49, 50, 51, 52, 53, 54, 55, 56, 57, 59, 147, 149; 464/167; 74/492, 493, 496, 503, 504, 552, 554; 180/89.12; 280/775

(56) References Cited

U.S. PATENT DOCUMENTS

| | | | | |
|---|---|---|---|---|
| 3,365,914 A | * | 1/1968 | Asher | 464/167 |
| 3,394,612 A | * | 7/1968 | Bogosoff et al. | 74/492 |
| 3,703,105 A | * | 11/1972 | Milton et al. | 74/492 |
| 4,006,647 A | * | 2/1977 | Oonuma et al. | 74/492 |
| 4,075,872 A | * | 2/1978 | Geisthoff | 464/167 |
| 4,103,514 A | * | 8/1978 | Grosse-Entrup | 464/167 |
| 4,308,728 A | * | 1/1982 | Croset | 464/167 |
| 4,406,641 A | * | 9/1983 | Mallet | 464/180 X |
| 4,433,875 A | * | 2/1984 | Walter et al. | 384/49 |
| 4,509,386 A | * | 4/1985 | Kimberlin | 74/492 |
| 4,667,530 A | | 5/1987 | Mettler et al. | 74/493 |
| 4,705,491 A | * | 11/1987 | Andersson | 464/167 |
| 4,898,566 A | * | 2/1990 | Hakansson | 464/167 |
| 5,413,417 A | | 5/1995 | Labedan | 384/572 |
| 5,460,574 A | | 10/1995 | Hobaugh | 464/162 |
| 5,709,605 A | | 1/1998 | Riefe et al. | 464/83 |
| 5,732,600 A | * | 3/1998 | Peterson et al. | 74/492 |
| 5,813,794 A | * | 9/1998 | Castellon | 74/492 X |
| RE36,405 E | * | 11/1999 | Akita et al. | 384/147 |
| 6,035,740 A | * | 3/2000 | Budaker et al. | 74/493 |
| 6,099,036 A | * | 8/2000 | Fujiu et al. | 74/492 X |
| 6,200,225 B1 | * | 3/2001 | Hobaugh, II | 464/167 |
| 6,434,993 B1 | * | 2/2002 | Duval et al. | 464/167 |

FOREIGN PATENT DOCUMENTS

| | | |
|---|---|---|
| DE | 3730393 | 3/1989 |
| EP | 0612650 A1 * | 2/1994 |
| FR | 1597341 | 7/1970 |
| JP | 62-85762 * | 4/1987 |

* cited by examiner

Primary Examiner—David A. Bucci
Assistant Examiner—Colby Hansen
(74) Attorney, Agent, or Firm—Ostrolenk, Faber, Gerb & Soffen, LLP

(57) ABSTRACT

The invention comprises a male member (11) having an inner lateral surface and a female member (10) having an outer lateral surface both provided with longitudinal grooves (13) and longitudinal protrusions (15) in conjunction with longitudinal protrusions (16) and longitudinal grooves (17). They enable relative longitudinal sliding between the male tube member (11) and the female tube member (10). To avoid and to absorb play between the female tube member (10) and the male tube member (11) adjusting elements (24) are designed which, as shown in FIG. 1, comprise a substantially prismatic longitudinal body at the vertexes of which there are stumps (26).

20 Claims, 2 Drawing Sheets

TELESCOPIC SHAFT FOR STEERING COLUMNS IN MOTOR VEHICLES WITH LOADING CONTROL SLIDING SYSTEM

BACKGROUND OF THE INVENTION

The invention refers to a sliding control system with loading control for telescopic shafts to be used in steering columns in motor vehicles. Such telescopic shafts comprise a female member and a male member in the form of tube pieces inserted one within the other. They are provided, at the interface thereof, that is to say the female member inner lateral surface and the male member outer lateral surface, with a number of ribs and longitudinal grooves that mutually engage enabling the rotation of all the mentioned pieces.

The present invention relates to those telescopic systems undergoing longitudinal displacement of one member relative to the another (displacement of the male member relative to the female member), under controllable load conditions which can take place either on actuating the telescopic regulation mechanism when steering wheel height with regard to the driver is desired to be changed or when it is desired to facilitate assembly on the motor vehicle, or finally the shock that the steering system suffers on proving its performance as a security system for the vehicle to which it is fitted.

SUMMARY OF THE INVENTION

In order to meet the previous requirements and technical conditions it has been designed that between said male member outer lateral surface and said female member inner lateral surface, both members are provided with longitudinal grooves on the lateral surface thereof. There is also provided a group of rollers fastened through the corresponding sleeves according to the above mentioned technical requirements and operation features.

The system of the present invention provides the above mentioned loading control action at the same time it facilitates taking-up of play between the male and the female members. Furthermore, the relative movement between these members or the adjusted load value that is causing it, will be affected by torque created by rotation to which said male member and female member are subjected.

The invention provides that stress which is necessary for the relative displacement between the two parts of the telescopic shaft is kept constant for any application and along all the displacement path in such a way that the assembly is provided with a certain braking or damping performance to the applied load.

Although the system of the invention has been devised to be used in a direct way, specifically in the steering columns in motor vehicles it is possible to be fitted in other applications due to its simplicity and easy operation.

Regarding the possibility that the system of the invention can be used as a security system for the motor vehicle, this is made possible by the particularity of that system of being able to have a braking or damping performance, either in the extended or in the retracted condition, absorbing the energy liberated in the event of crash, further keeping constant the necessary stress for relative displacement between the members in the telescopic shaft along the displacement path.

In addition, the present invention also provides the possibility to facilitate the correction of the play that usually appears between different tube pieces in the telescopic shafts, thus avoiding the undesirable play producing noise and vibration on running the vehicle. Transferring noise and vibration to the steering wheel and therefore to the user is also avoided as well as it provides a perfect assembly operation.

On the other hand, the conceptual mechanism that is provided takes into consideration the significance of torque which should be applied for rotation of the whole telescopic shaft on the previously mentioned sliding load between the two members with relative displacement. Such mechanism allows to separate, almost completely, this torque from the longitudinal action of the movement caused by the axial load, so that the effect caused by this torque becomes minimum.

The present invention heightens the easiness of assembling. Assembling is carried out by using few auxiliary and accessory elements and, in any case, its great assembling simplicity does not involve that weight and costs become significantly increased as compared to the advantages of the system itself.

Another object of the present invention is to provide a loading control system which is suitable to adjust the stress during the relative displacement between the parts of the telescopic shaft of the steering column. The invention further allows for a good development of the movement by integrally joining all the live parts to one another minimizing the play as well as the influence of the torque related to rotation. It further provides an effective mechanical arrangement which is also simple and cost effective.

Further details and features of the present patent application will be apparent from the following description, which refers to the accompanying drawings that schematically represent the preferred details. These details are given by way of example, which refer to a possible case of practical embodiment, but it is not limited to the details disclosed herein; therefore this description must be considered from an illustrating point of view and without any type of limitations.

A detailed list of the various parts cited in the present patent application is given below: (10) female tube member, (11) male tube member, (12) mouth, (13) longitudinal grooves, (14) fork, (15) longitudinal protrusion, (16) longitudinal protrusion, (17) longitudinal grooves, (18) fork, (19) regulator, (20) head, (21) cylindrical portion, (22) closure, (23) ridges, (24) adjusting element, (25) body, (26) stump, (27) rollers, (28) sleeve.

Figure 2:
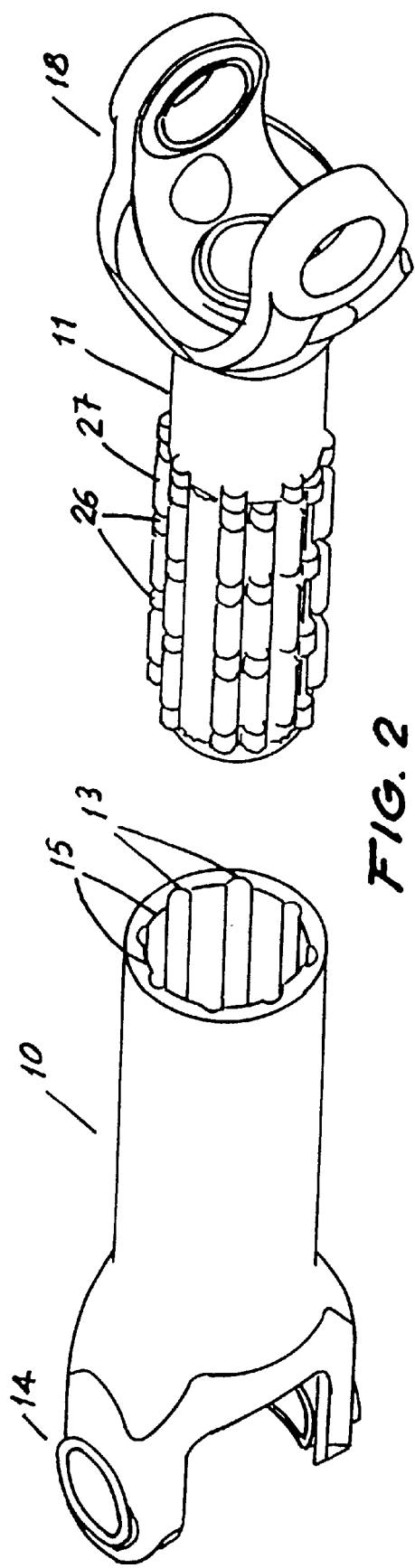

The FIG. 2 is perspective view of the assembly, which also corresponds to the same example of the telescopic shaft, in which the most significant parts are shown separated with the purpose of clarifying in more degree the actual condition thereof.

Figure 3:
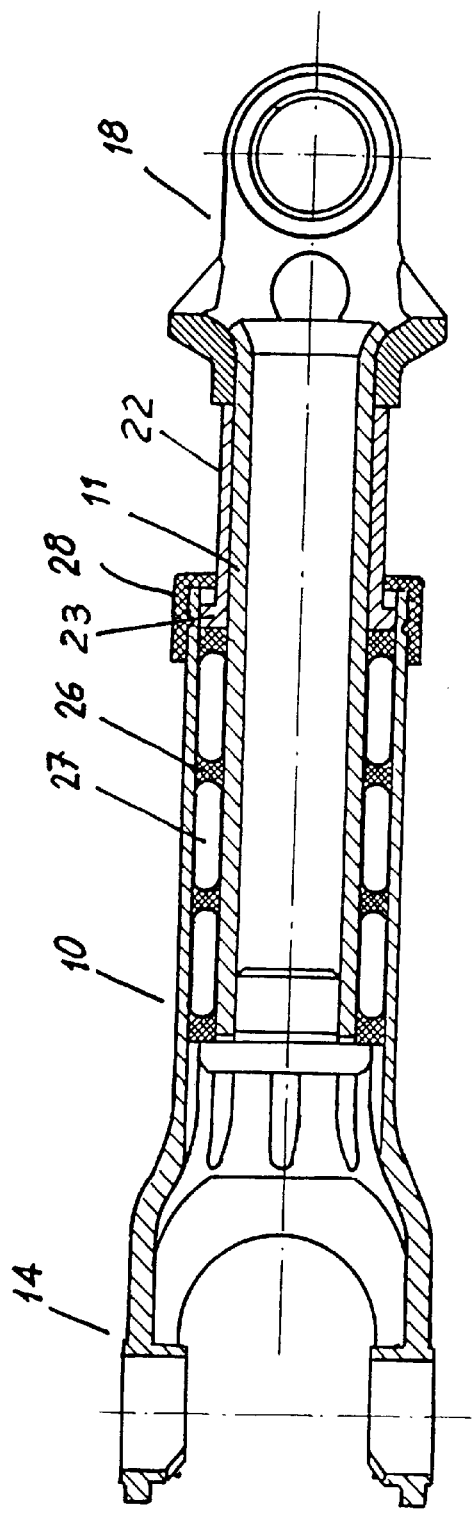

The FIG. 3 is an elevational end view showing a longitudinal section of the telescopic shaft assembly once it has been assembled, wherein the final condition of all the parts is shown.

DETAILED DESCRIPTION OF THE INVENTION

Figure 1:
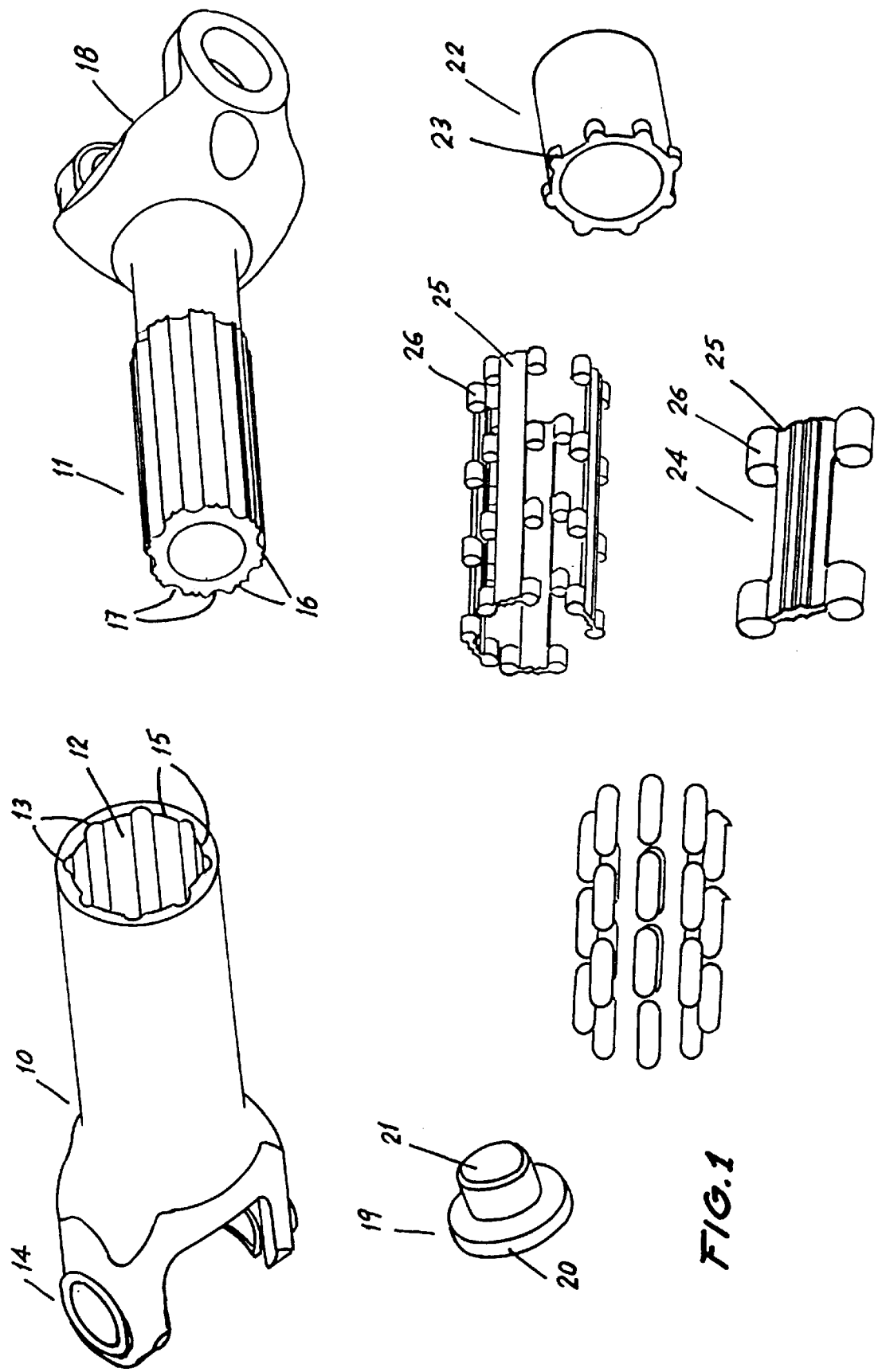
FIG. 1 is a perspective of an exploded view in which the main parts in the system of the present invention are shown.

In one of the preferred embodiments of what is the object of the present invention, and as it can be seen from FIG. 1, the telescopic shaft comprises a female tube member (10) provided with a fork (14) in one of the ends thereof. The inner surface of its mouth (12) has a plurality of longitudinal grooves (13) separated by longitudinal protrusions (15).

The male tube member (11) has a cylindrical portion one end of which extends forming a fork (18).

The outer surface of the male tube member (11) is provided with a plurality of spaced longitudinal protrusions (16) arranged between longitudinal grooves (17).

As the inner lateral surface of the female member (10) and the outer lateral surface of the male member (11) are both provided with longitudinal grooves in the longitudinal protrusions (15) in conjunction with the longitudinal protrusions (16) and the longitudinal grooves (17), relative longitudinal sliding between both pieces (10) and (11) is thus possible.

Adjusting elements (24) are designed for the purpose of avoiding and absorbing rotational play that could exist between the female tube member (10) and the male tube member (11). As it can be seen from FIG. 1, adjusting elements (24) comprise a substantially prismatic longitudinal body (25) having at the vertexes of which there are provided stumps (26). Rollers 27, which function as bearing elements are fitted between stumps 26, as best illustrated in FIGS. 2 and 3.

Adjusting elements (24) which can be made of plastic or another similar material are designed to allow fastening of the rollers (27) which can be made of specular finished hard steel with the purpose of enabling relative motion between the members (10) and (11) in a way as easy as possible.

This adjusting element (24) allows absorption of play that could exist between the members (10) and (11), by torque of rotation which occurs during the normal operation of the whole assembly of the telescopic shaft since it can be self aligned to be adapted, during rotation, to the corresponding grooves and ribs, both in the female member (10) and the male member (12), on which it is seated, serving as an intermediate piece therebetween.

On the other hand, to adjust rotation and sliding it has been devised a plug (19), see FIG. 1, which comprises a substantially cylindrical head (20) extending in another cylindrical portion (21) having a smaller diameter. Said plug (19) is housed in the male member (11) sliding end (see FIG. 3) and it serves the purpose of forcing the preload or folding or sagging condition of the element (24) in such a way that sliding between members (10) and (11) is performed in a controlled way, through the friction load caused by the adjusting element (24) in its contact with the female member (11) under the stress created by the present load.

To enable the above mentioned preload, caused by the regulation system achieved by the plug (19) on the adjusting element (24), the piece (22) acts as a closure opposed to plug (19) and seated on the male member (11). Therefore, its length allows it to be supported at one of its end by the fork and by the plastic sleeve for the other end.

Also in the FIG. 1 the possibility is detailed that the sleeve or adjusting element (24) can be formed in turn by simple elements (24-25-26), the combination of which can provide the assembly the most appropriate form in each possible case further enabling the different functions to be assigned to this element (24):

Accurately having the ability of an appropriate fastening of the rollers (27), which can vary in number, form and size according to each of the previously mentioned cases. Rotation transmission between the male member (11) and the female member (10) is carried out without any problem, both relating to movement effectiveness and regarding noise and vibration decreasing. Therefore, all possible metallic contact is avoided between the different pieces.

Having the necessary and required friction load with the male member (11) and female member (10) by means of the elastic folding itself originated by the preload applied through regulation supplied by the plug (19).

Avoiding presence of play between the female member (10) and the male member (11), by appropriately seating of the elastic teeth in each of the elements of the adjusting element (24). They are engaged to the longitudinal grooves and the longitudinal protrusions provided therein. Said elements are adjusted in all cases and in accordance with the degree of torque that is applied thereon.

All the above mentioned is carried out by the inherent elasticity of the material of the adjusting element (24) which enables the system to be formed by the male member (11), the female member (10) and the adjusting element (24) along with the rollers (27), giving rise to an unit which is rigidly formed, as it can be deduced when observing FIG. 2.

On the other hand, in FIG. 3 an assembly of the different pieces forming the telescopic shaft in its corresponding position, once assembly has been terminated, is shown. In such position, shaft is ready to operate in an effective way, during the operation of the assembly. There is also a further part: the retaining sleeve (28). It serves the purpose of closing the whole assembly thus preventing assembly from being taken apart, mainly between the two tube members (10) and (11) at the same time it could operate as a shutter for the existing lubricant grease between the sliding pieces.

As it can be seen from FIG. 3, sleeve (28), which serves the purpose of closing the whole assembly, prevents the assembly from being taken apart, mainly between the two tubular members, the male member (11) and the female member (10). If further serves as a shutter for the existing lubricant grease between the above mentioned sliding pieces.

As it can be observed in FIG. 3, this sleeve (28) can be arranged laterally fixed, as shown in FIG. 3, axially or in any other suitable way, to the female tube member (10), either by a press-fit assembly, with a certain number of pressure notches, as shown in the present embodiment, or by other ancillary fixing elements. It is also envisaged that the sleeve is removable.

Although the different pieces in the system could be made of any material, according to the type of application where it will be used, elements (24), (22) and (28) will be mainly designed so that they fulfil in a appropriate way the functions that they have assigned. They also cooperate for the whole assembly to be as light and cheap as possible.

Once the invention has been sufficiently described in accordance to the enclosed drawings, it is understood that any modification can be introduced as appropriate, provided that variations may alter the essence of the invention as summarised in the appended claims.

What is claimed is:

1. A telescopic shaft comprising:
   a female tube member having a coupler at a first end, and a longitudinal cavity open at a second opposite end, the inner surface of which cavity includes a plurality of circumferentially spaced, longitudinally ribs which define alternating grooves and protrusions;
   a male tube member telescopically receivable within the longitudinal cavity in the female tube member, the male tube member having a coupler at one end, a longitudinally extending cavity at the other end, and a plurality of circumferentially spaced, longitudinally ribs which define alternating grooves and protrusions extending along the outer surface thereof between the two ends, the ribs on the tube members being so dimensioned and spaced that the protrusions on the male member fit into the grooves in the female member and the protrusions on the female member fit into the grooves in the male member when the male member is telescopically received in the female member;

an adjusting member disposed between the outer surface of the male tube member and the inner surface of the cavity in the female tube member, the adjusting member being comprised of a longitudinally extending, circumferentially spaced, resilient, substantially prismatic body portion;

a closure element positioned on one of the tube members that engages with a first end of the resilient body portion; and a plug member that applies an axial force to a second opposite end of the resilient body portion, whereby the resilient body portion is radially distorted to engage with the outer surface of the male tube member and the inner surface of the cavity in the female tube member, and thereby to prevent rotational play and to control the friction during relative axial movement of the female and male tube members.

2. A telescopic shaft as described in claim 1, wherein the plug member is positioned in the longitudinally extending cavity in the male member, and includes a radially extending head that engages with the second end of the resilient body portion to apply the axial distorting force.

3. A telescopic shaft as described in claim 1, wherein the closure element includes:

a tubular body positioned on the male tube member with a first end in engagement with the coupler on the male tube member; and a radially enlarged portion at a second opposite end that engages with the first end of the resilient body portion.

4. A telescopic shaft as described in claim 3, further including:

a sleeve having an open first end that extends over the second end of the female tube member; and an opposite partially closed end that has on opening therein that receives the tubular body of the closure element with the radially enlarged portion located between an inner surface of the closed end and the first end of the resilient body portion.

5. A telescopic shaft as described in claim 1, wherein the adjusting member includes a plurality of elongated rods extending along longitudinal edges of the resilient body portion.

6. A telescopic shaft as described in claim 5, further including a plurality of stumps spaced along the longitudinal edges of the resilient body portion with the elongated rods retained between adjacent stumps.

7. A telescopic shaft as described in claim 6, wherein the rods and the stumps are positioned between the grooves on the female tube member and respective aligned protrusions on the male tube member.

8. A telescopic shaft as described in claim 5, wherein:
the resilient body portion of the adjusting member is formed of a plastic material; and
the rods are formed of specular finished hard steel.

9. A telescopic shaft as described in claim 8, wherein the rods engage the adjacent surfaces of the male and female tube members to provide sliding bearings.

10. A telescopic shaft as described in claim 5, wherein the rods are positioned between the grooves on the female tube member and respective aligned protrusions on the male tube member.

11. A telescopic shaft comprising:

a female tube member having a coupler at a first end, and a longitudinal cavity open at a second opposite end, the inner surface of which cavity includes a plurality of circumferentially spaced, longitudinally ribs which define alternating grooves and protrusions;

a male tube member telescopically receivable within the longitudinal cavity in the female tube member, the male tube member having a coupler at one end, a longitudinally extending cavity at the other end, and a plurality of circumferentially spaced, longitudinally ribs which define alternating grooves and protrusions extending along the outer surface thereof between the two ends, the ribs on the tube members being so dimensioned and spaced that the protrusions on the male member fit into the grooves in the female member and the protrusions on the female member fit into the grooves in the male member when the male member is telescopically received in the female member;

an adjusting member assembly disposed between the outer surface of the male tube member and the inner surface of the cavity in the female tube member, the adjusting assembly being comprised of a plurality of longitudinally extending, resilient, substantially prismatic body portions circumferentially spaced around the male tube member;

a closure element positioned on one of the tube members that engages with first ends of the resilient body portions; and a plug member that applies an axial force to second opposite ends of the resilient body portions, whereby the resilient body portions are radially distorted to engage with the outer surface of the male tube member and the inner surface of the cavity in the female tube member, and thereby to prevent rotational play and to control the friction during relative axial movement of the female and male tube members.

12. A telescopic shaft as described in claim 11, wherein the plug member is positioned in the longitudinally extending cavity in the male member, and includes a radially extending head that engages with the second ends of the resilient body portions to apply the axial distorting force.

13. A telescopic shaft as described in claim 11, wherein the closure element includes:

a tubular body positioned on the male tube member with a first end in engagement with the coupler on the male tube member; and a radially enlarged portion at a second opposite end that engages with the first ends of the resilient body portions.

14. A telescopic shaft as described in claim 13, further including:

a sleeve having an open first end that extends over the second end of the female tube member; and an opposite partially closed end that has on opening therein that receives the tubular body of the closure element with the radially enlarged portion located between an inner surface of the closed end and the first ends of the resilient body portions.

15. A telescopic shaft as described in claim 11, wherein the adjusting member includes a plurality of elongated rods extending along longitudinal edges of the body portions.

16. A telescopic shaft as described in claim 15, further including a plurality of stumps spaced along the longitudinal edges of the body portions with the elongated rods retained between adjacent stumps.

17. A telescopic shaft as described in claim 16, wherein the rods and the stumps are positioned between the grooves on the female tube member and respective aligned protrusions on the male tube member.

18. A telescopic shaft as described in claim 15, wherein:

the body portion of the adjusting member is formed of a plastic material; and the rods are formed of specular finished hard steel.

19. A telescopic shaft as described in claim 18, wherein the rods engage the adjacent surfaces of the male and female tube members to provide sliding bearings.

20. A telescopic shaft as described in claim 15, wherein the rods are positioned between the grooves on the female tube member and respective aligned protrusions on the male tube member.

* * * * *